US008090105B2

(12) United States Patent
Lotspiech

(10) Patent No.: US 8,090,105 B2
(45) Date of Patent: Jan. 3, 2012

(54) BROADCAST ENCRYPTION WITH DUAL TREE SIZES

(75) Inventor: Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 1307 days.

(21) Appl. No.: 10/904,735

(22) Filed: Nov. 24, 2004

(65) Prior Publication Data

US 2006/0109985 A1 May 25, 2006

(51) Int. Cl.
*H04L 9/00* (2006.01)
(52) U.S. Cl. ............ 380/277; 380/30; 380/44; 713/166; 713/153; 713/156
(58) Field of Classification Search ................... 380/277
See application file for complete search history.

(56) References Cited

U.S. PATENT DOCUMENTS

| | | | |
|---|---|---|---|
| 4,881,264 A | | 11/1989 | Merkle |
| 4,888,801 A * | | 12/1989 | Foster et al. ................. 380/277 |
| 4,944,009 A | | 7/1990 | Micali et al. |
| 6,118,873 A | | 9/2000 | Lotspiech et al. |
| 6,263,435 B1 | | 7/2001 | Dondeti et al. |
| 6,307,936 B1 * | | 10/2001 | Ober et al. ...................... 380/30 |
| 6,609,116 B1 | | 8/2003 | Lotspiech et al. |
| 6,735,312 B1 | | 5/2004 | Abdalla et al. |
| 6,751,634 B1 | | 6/2004 | Judd |
| 7,373,503 B2 * | | 5/2008 | Nakano et al. ................ 713/158 |
| 7,584,466 B1 * | | 9/2009 | Rao ................................ 717/168 |
| 7,716,475 B2 * | | 5/2010 | Asai et al. ..................... 713/166 |
| 7,721,085 B1 * | | 5/2010 | Xiong et al. .................. 713/153 |
| 7,873,168 B2 * | | 1/2011 | Tateoka et al. ................ 380/282 |
| 7,894,603 B2 * | | 2/2011 | Senshu ......................... 380/200 |
| 2002/0006196 A1 * | | 1/2002 | Shimoyama et al. ........... 380/44 |
| 2002/0085722 A1 | | 7/2002 | Asano et al. |
| 2002/0104001 A1 | | 8/2002 | Lotspiech et al. |
| 2002/0106087 A1 | | 8/2002 | Lotspiech et al. |
| 2002/0114471 A1 | | 8/2002 | Fagin et al. |
| 2002/0133701 A1 | | 9/2002 | Lotspiech et al. |
| 2002/0136411 A1 | | 9/2002 | Ishiguro et al. |
| 2002/0147906 A1 | | 10/2002 | Lotspiech et al. |
| 2002/0150250 A1 | | 10/2002 | Kitaya et al. |
| 2002/0194209 A1 | | 12/2002 | Bolosky et al. |
| 2003/0081786 A1 * | | 5/2003 | Nakano et al. ................ 380/277 |
| 2003/0182565 A1 | | 9/2003 | Nakano et al. |
| 2004/0107341 A1 | | 6/2004 | Hall et al. |
| 2004/0141613 A1 | | 7/2004 | Hayashi |

(Continued)

OTHER PUBLICATIONS

D. Wallner, E. Harder, and R. Agee, AKey Management for Multicast: Issues and Architectures@, IETF draft RFC2627, 1997, available at ftp.ieff.org/rfc/rfc2627.txt.

(Continued)

*Primary Examiner* — Nabl El Hady
*Assistant Examiner* — Yonas Bayou
(74) *Attorney, Agent, or Firm* — Marc D. McSwain; Mohammed Kashef; Daniel E. Johnson

(57) ABSTRACT

A method, system, and computer program product for broadcast encryption key management. The invention eliminates the need for pre-specification of a maximum number of keys that can be employed in a given broadcast encryption system by enabling an initial key to be extended by a link key. New receiver devices are modified to validate the extended keys, while older devices ignore them and process initial keys as usual. Compromised link keys can be revoked, though revocation preferably uses a unique.

19 Claims, 1 Drawing Sheet

U.S. PATENT DOCUMENTS

| | | | |
|---|---|---|---|
| 2004/0153674 | A1 | 8/2004 | Hayashi |
| 2004/0165724 | A1 | 8/2004 | Choi et al. |
| 2005/0018853 | A1* | 1/2005 | Lain et al. .................... 380/277 |
| 2006/0177066 | A1* | 8/2006 | Han et al. ..................... 380/277 |
| 2007/0067244 | A1* | 3/2007 | Jin et al. .......................... 705/59 |

OTHER PUBLICATIONS

Chung Kei Wong, Mohamed G. Gouda, Simon S. Lam, ASecure Group Communication Using Key Graphs@, Proceedings of the ACM SIGCOMM 1998 Conference on Applications, Technologies, Architectures, and Protocols for Computer Communication, p. 68-79.

Dani Halevy and Adi Shamir, AThe LSD Broadcast Encryption Scheme@, Lecture Notes in Computer Science, Proceedings of the 22nd Annual International Cryptology Conference on Advances in Cryptology, vol. 2442, Aug. 18-22, 2002, p. 47-60.

\* cited by examiner

BROADCAST ENCRYPTION WITH DUAL TREE SIZES

FIELD OF THE INVENTION

This invention relates generally to data encryption and more specifically to the encryption of broadcast programs such that unauthorized clone receivers cannot easily decrypt the programs.

RELATED ART

The following articles and commonly-owned and commonly-assigned patent applications and issued patents are hereby incorporated in their entirety by reference:

- D. Wallner, E. Harder, and R. Agee, "Key Management for Multicast: Issues and Architectures", IETF draft RFC2627, 1997, available at ftp.ietf.org/rfc/rfc2627.txt.
- Chung Kei Wong, Mohamed G. Gouda, Simon S. Lam, "Secure Group Communication Using Key Graphs", Proceedings of the ACM SIGCOMM 1998 Conference on Applications, Technologies, Architectures, and Protocols for Computer Communication, p. 68-79.
- Dani Halevy and Adi Shamir, "The LSD Broadcast Encryption Scheme", Lecture Notes in Computer Science, Proceedings of the $22^{nd}$ Annual International Cryptology Conference on Advances in Cryptology, volume 2442, Aug. 18-22, 2002, p. 47-60.
- U.S. Pat. App. Pub. 2002/0147906A1 published Oct. 10, 2002, "Method for Broadcast Encryption and Key Revocation of Stateless Receivers".
- U.S. Pat. App. Pub. 2002/0133701A1 published Sep. 19, 2002, "Method for Tracing Traitor Receivers in a Broadcast Encryption System".
- U.S. Pat. App. Pub. 2002/0106087A1 published Aug. 8, 2002, "Method for Assigning Encryption Keys". U.S. Pat. App. Pub. 2002/0114471A1 published Aug. 22, 2002, "Method for Assigning Encryption Keys".
- U.S. Pat. App. Pub. 2002/0104001A1 published Aug. 1, 2002, "Method for Ensuring Content Protection and Subscription Compliance".
- U.S. Pat. No. 6,118,873 issued Sep. 12, 2000, "System for Encrypting Broadcast Programs in the Presence of Compromised Receiver Devices".
- U.S. Pat. No. 6,609,116B1 issued Aug. 19, 2003, "System and Method for Securely Updating Copy-Protected Media".

BACKGROUND OF THE INVENTION

Broadcast encryption schemes enable a center to deliver encrypted data to a large set of users so that only a particular subset of privileged users can decrypt it. Such schemes are useful in pay-TV systems, the distribution of copyrighted material on encrypted media, and internet multicasting. In one exemplary scenario, authorized pay-per-view customers are provided with so-called "set top boxes" that decrypt the programs in accordance with decryption algorithms inside the boxes. Various billing schemes may be tied to the set-top boxes or other customer identification to ensure that authorized customers are billed for the programs they receive. While effective for blocking access to many non-paying customers, such boxes can be cloned using relatively sophisticated cloning techniques, then sold to people who can then use the clones to watch and/or copy for free the otherwise pay-per-view programs.

Similarly, movie studios are reluctant to distribute protected content via high-definition DVD unless some assurance is provided that only DVD players and recorders made by manufacturers who have agreed to content protection protocols can view or copy the content, and unauthorized recipients can be somehow neutralized. While it is occasionally possible to discover a single receiver or player, most remain undetected in users' homes, leading to a loss of revenue for the broadcasters. This loss of revenue is a growing problem, particularly with the growth of in-home digital video devices, because digital copies are perfect copies. Indeed, the growth of digital video has led to the introduction of a new digital bus standard referred to both as "Firewire" and "IEEE 1394", which has been proposed to standardize the interconnections between a user's digital television, digital video cassette recorder, digital video disk player, and set-top box. Cellular phones may also be receiver devices.

Because millions of receiver devices might conceivably use the same decryption keys, it is not feasible to individually reprogram each authorized device with new decryption keys. Indeed, the only feasible way to reprogram millions of in-home decryption receivers of encrypted broadcast programs is to broadcast a new encryption key, but then the unauthorized clones also receive the broadcast of the new key, leading to the classic broadcast encryption conundrum: how can authorized receivers be efficiently reprogrammed with new decryption keys while disenfranchising unauthorized clones?

Accordingly, U.S. Pat. No. 6,118,873 provides an encryption system for the secure broadcasting of programs, including updates to authorized in-home digital video devices. That patent discloses a system for encrypting broadcast music, videos, and other content. As set forth therein, only authorized player-recorders can play and/or copy the content and only in accordance with rules established by the vendor of the content. In this way, pirated copies of content, which currently cost content providers billions of dollars each year, can be prevented. As disclosed in the '873 patent, authorized player-recorders are issued software-implemented device keys from a matrix of device keys termed a media key block. The keys can be issued simultaneously with each other or over time, but in any event, no player-recorder is supposed to have more than one device key per column of the matrix. Although two devices might share the same key from the same column, the chances that any two devices share exactly the same set of keys from all the columns of the matrix are very small when keys are randomly assigned. The keys are used to decrypt content.

In the event that a device (i.e. its keys) becomes compromised, deliberately or by mistake, it is necessary to revoke the keys of that device. Revoking a set of keys effectively renders the compromised device (and any clones thereof) inoperable to play or record content that is produced after the revocation. The presence of more than a few "rogue" manufacturers (i.e., manufacturers who legally or illegally obtain keys but who in any case make many unauthorized devices having the keys) can be problematic. It is therefore desirable to account for potentially many rogue manufacturers by executing a large number of device revocations. However, since in the '873 system more than one device can share any particular key with the compromised device, revoking a set of device keys might result in revoking keys held by some innocent devices. It is desirable to further reduce the chances of accidentally revoking a "good" device, preferably to zero. It is also desirable to minimize the number and length of key management messages and the amount of storage required by each device.

The latest broadcast encryption technologies designed to meet these goals are based on trees of keys. The so-called "Logical Key Hierarchy" key management system was originally developed independently by Wallner and Wong, cited above. Later, there was the much more concise subset-difference tree, developed at IBM by Naor, Naor, and Lotspiech (NNL) and described in the cited '701 and '906 applications; these applications also describe related traitor tracing schemes (i.e. determining the keys of rogue receivers to enable their revocation while avoiding impacting innocent devices that may share some of the same keys). Most recently, there was an improvement on the NNL subset-difference method by Shamir and Halevy, cited above, that reduced the number of keys required in the device.

It is very convenient if these key trees are "32-bit trees". That means there are $2^{32}$ nodes in the tree, and therefore that all the calculations can be performed with 32-bit integer arithmetic, which is a natural number for modern processors. A 32-bit binary tree has $2^{31}$ leaf nodes; therefore such a tree can support more than two billion individual devices. Two billion seems like a lot of devices, but if a content protection scheme becomes ubiquitous, such that every potential receiver device imaginable supports it, it is not sufficient. Larger key trees are required to support more devices.

For example, a 40-bit tree supports more than enough devices (over 500 billion), but requires awkward 5-byte integer calculations in each device. Even worse, the number of keys that need to be stored in a tree-based scheme is a function of the height of the tree, so that the larger tree requires every device to implement more secure storage for keys. Thus, the following dilemma has heretofore faced designers of content protection schemes based on broadcast encryption: should they risk the convenient 32-bit tree size and hope that their scheme is not too successful, or should they propose a more awkward, expensive scheme whose extra capacity might never be needed. It would be a disaster if a 32-bit tree overflows, because historically one would have to deploy a new, incompatible scheme once it became necessary to support more than two billion devices.

SUMMARY OF THE INVENTION

It is accordingly an object of this invention to provide a system, method, and computer program product for extending a broadcast encryption key management scheme. The invention selectively issues at least one link key to extend initial keys when the number of devices that can be supported by the initial keys is exceeded, and new receiver devices are modified to process the extended keys using new media key blocks that include at least one media key encrypted with the link key. New receivers validate the extended keys using the new media key blocks. Link keys can be revoked like other keys, though a unique syntax for link key revocation may be preferred. Initial keys are typically 32-bit keys, and link keys may be 8-bit keys so that 40-bit extended keys are created.

In an exemplary embodiment, existing receiver devices ignore the at least one link key and continue to process only initial keys to provide backward compatibility. The extended key tree may be designed such that the initial key tree is the sub-tree processed first, for simplicity.

The foregoing objects are believed to be satisfied by the exemplary embodiment of the present invention as described below.

DETAILED DESCRIPTION OF THE INVENTION

The present invention solves the previously mentioned dilemma faced by designers of successful content protection schemes, wherein the risk of overflowing the maximum manageable number of keys must be balanced against message complexity and device storage requirements. The invention allows a large tree to appear to be a smaller tree at first. Later, if the larger tree becomes necessary it can be deployed in a compatible way. Thus, the maximum number of devices initially supported by a tree can be extended. In other words, the media key blocks from the smaller trees can be read by the devices in the larger tree, and vice versa. Therefore, with this invention, it is no longer necessary to design for the maximum-size possible tree.

Figure 1:
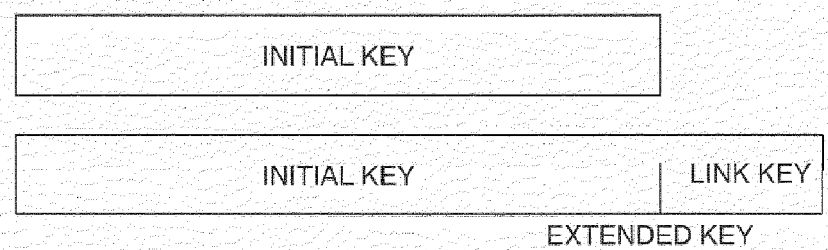
FIG. 1 is a diagram of an initial key and an extended key, according to an embodiment of the invention.
Figure 2:
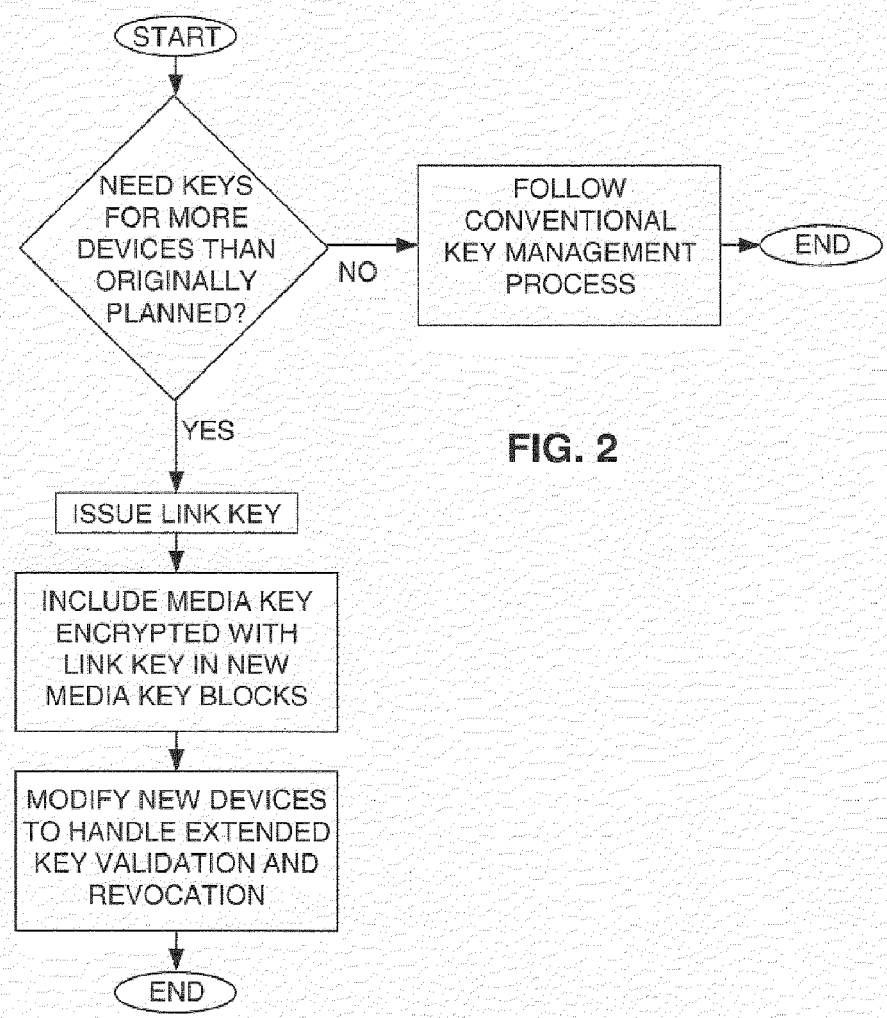
FIG. 2 is a flowchart of a method of extended key management, according to an embodiment of the invention.

Referring now to FIG. 1, the invention extends the initial media key block with an additional key called the link key. The link key is not assigned to any device in the initial tree. However, it will be given to every new device if the tree ever needs to be extended, as described in FIG. 2. A media key block normally contains the encryptions of the media key in various device keys (the specific set of device keys naturally depends on which compromised devices need to be excluded). In this invention, the initial media key blocks (the blocks using the old key) contain these encryptions in the normal way. In addition, the initial media key blocks also contain one other encryption: the encryption of the media key in the link key. Later, if additional devices are needed, they can process the old media key blocks and calculate the media key, because the new devices will have the link key.

What happens to the old devices after the tree needs to expand and new media key blocks are produced based on the larger tree? Preferably, the old devices are designed so that they ignore any part of the media key block that they do not understand. This is fortunately the normal practice today, in media key blocks produced by the 4C Entity as part of the well-known CPRM (Content Protection for Recordable Media) scheme. It certainly does not present any problem to the old devices, as ignoring things is always easy. Thus, the new media key blocks can have additional records, ignored by the old devices, that are processed only by the new devices based on the larger tree. The old devices continue to process their records correctly.

In a preferred embodiment, the initial 32-bit tree is designed as the leftmost sub-tree of the larger eventual tree. If the tree is processed left-to-right bottom-to-top, which is the normal way, then all of the instructions for the old devices are naturally processed in the first part of the media key block. Thus it is not even necessary to define new records: the old devices are satisfied by the first part of the record, and never get to the further instructions (those using 5-byte instead of 4-byte integers, for example) for the new devices. Nonetheless, this processing order and tree design is not an essential part of the invention, but it is a simple elegant solution.

What happens if the link key is compromised? In that instance, old media key blocks can be read by the compromised devices, but then this is always true for any device key. In the event of a compromised link key, it is a simple matter to define a new link key for new blocks, and make sure that all new devices have all link keys for backward compatibility. Any number of link keys may distributed. In the preferred embodiment above, when the initial tree is the leftmost sub-tree of the larger tree, the link key has a very natural meaning: it is the root key of the sub-tree in the larger tree. Thus, it can be revoked in the same way any compromised key is revoked. However, it is within the scope of this invention that if the link key(s) are revoked they are revoked with a special syntax that is unique to link key revocation. Of course, it is highly unlikely that a link key will be compromised while the tree is still small, because the link key is a secret that never leaves the licensing agency until new devices (i.e. beyond the previous maximum number of supported devices) are needed. The link key will have to be broken by cryptanalysis, not reverse-engineering, and hackers rarely try to break systems that way.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular BROADCAST ENCRYPTION WITH DUAL SIZE TREES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A method for extending an initial key management scheme that uses initial keys and supports initial devices, comprising:
    to support additional devices, issuing at least one link key to media key blocks (having initial keys) on content protected media, thereby extending said initial key management scheme, wherein said at least one link key is not assigned to any device in the initial key management scheme; and
    providing said additional devices said at least one link key, thereby permitting said additional devices to be configured to process said at least one link key, wherein said additional devices are not part of the initial key management scheme.

2. The method of claim 1, wherein the initial and extended key management schemes are used for broadcast encryption.

3. The method of claim 1 wherein the at least one link key is issued when the number of initial devices exceeds the number of devices supported by the initial key management scheme.

4. The method of claim 1, wherein the media key blocks are configured such that the additional devices selectively validate non-revoked extended keys, the media key blocks including at least one media key encrypted with the at least one link key.

5. The method of claim 1 wherein the at least one link key can be revoked.

6. The method of claim 1 wherein the initial keys are 32-bit keys.

7. The method of claim 1 wherein the extended keys are 40-bit keys.

8. The method of claim 1 wherein devices that are part of the initial key management scheme, ignore the at least one link key and continue to process only the initial keys, thereby providing backward compatibility.

9. The method of claim 8 wherein an initial key tree is a sub-tree of an extended key tree that is processed first.

10. A non-transitory computer-useable storage medium for extending an initial key management scheme that uses initial keys and supports initial devices, said medium having a computer-readable program, wherein the program upon being processed on a computer causes the computer to implement the steps of:
    to support additional devices, issuing at least one link key to media key blocks (having initial keys) on content protected media, thereby extending said initial key management scheme, wherein said at least one link key is not assigned to any device in the initial key management scheme; and
    providing said additional devices said at least one link key, thereby permitting said additional devices to be configured to process said at least one link key, wherein said additional devices are not part of the initial key management scheme.

11. The computer-useable storage medium of claim 10, wherein the initial and extended key management schemes are used for broadcast encryption.

12. The computer-useable storage medium of claim 10, wherein the at least one link key is issued when the number of initial devices exceeds the number of devices supported by the initial key management scheme.

13. The computer-useable storage medium of claim 10, wherein the media key blocks are configured such that the additional devices selectively validate non-revoked extended keys, the media key blocks including at least one media key encrypted with the at least one link key.

14. The computer-useable storage medium of claim 10, wherein the at least one link key can be revoked.

15. The computer-useable storage medium of claim 10, wherein the initial keys are 32-bit keys.

16. The computer-useable storage medium of claim 10, wherein the extended keys are 40-bit keys.

17. The computer-useable storage medium of claim 10, wherein devices that are part of the initial key management scheme, ignore the at least one link key and continue to process only the initial keys, thereby providing backward compatibility.

18. The computer-useable storage medium of claim 17, wherein an initial key tree is a sub-tree of an extended key tree that is processed first.

19. A method for extending an initial key management scheme that uses initial keys and supports initial devices, the method being performed by an additional device that is not part of the initial key management scheme, the method comprising:

receiving at least one link key for media key blocks on content protected media, said at least one link key being an extension to said initial keys, thereby extending said initial key management scheme, wherein said at least one link key is not assigned to any device in the initial key management scheme; and configuring the additional device for processing said at least one link key.

* * * * *